UNITED STATES PATENT OFFICE.

RUDOLF LINKMEYER, OF BRUSSELS, BELGIUM.

MANUFACTURE OF LUSTROUS CELLULOSE THREADS.

No. 839,013.      Specification of Letters Patent.      Patented Dec. 18, 1906.

Original application filed March 29, 1905, Serial No. 252,633. Divided and this application filed March 22, 1906. Serial No. 307,403.

*To all whom it may concern:*

Be it known that I, RUDOLF LINKMEYER, a subject of the German Emperor, residing at Brussels, Belgium, have invented new and useful Improvements in the Manufacture of Lustrous Cellulose Threads, of which the following is a specification.

This application is a division of the application filed March 29, 1905, Serial No. 252,633.

It is known that cellulose dissolved in a cupro-ammoniacal liquor may be precipitated in the form of threads by means of dilute sulfuric acid after the cellulosic solution has been thickened and passed through small apertures. The threads obtained by this method are, however, too fragile to be industrially utilizable, as the action of the dilute sulfuric acid produces a decomposition of the threads which destroys their strength. In order to obviate this defect, sulfuric acid in a highly-concentrated state is usually employed.

Now the present invention is based upon the discovery that the decomposition of the threads by the dilute sulfuric acid does not take place when the proportion of ammonia in the cellulosic solution has been previously reduced by the action of a vacuum or by the injection of air. The cause of the decomposition would appear to consist in the fact that a large part of the ammonia becomes free in the solution after the cellulose has been dissolved.

The present invention therefore consists in precipitating, by means of dilute acid, the cellulose contained in a cellulosic cupro-ammoniacal solution from which uncombined ammonia has been previously extracted.

By means of a solution of sulfuric acid of twenty per cent., for example, non-adherent threads are obtained which do not break during weaving and which may be rapidly drawn very finely.

Having now described my invention, what I claim as new, and desire to secure by Letters Patent, is—

1. A process for the manufacture of lustrous cellulose threads, by means of a cupro-ammoniacal solution of cellulose, consisting in extracting a portion of the ammonia contained in said solution and in then causing the same to pass in the form of a very fine jet into a dilute acid.

2. A process for the manufacture of lustrous cellulose threads, by means of a cupro-ammoniacal solution of cellulose, consisting in extracting a portion of the ammonia contained in said solution and in then causing the latter to pass in the form of a very fine jet into a sulfuric-acid solution at twenty per cent. for example.

In testimony whereof I have affixed my signature in presence of two subscribing witnesses.

RUD. LINKMEYER.

Witnesses:
     H. J. E. KIRKPATRICK,
     L. PIÉRARD.